(12) United States Patent
Dasari et al.

(10) Patent No.: US 11,730,177 B2
(45) Date of Patent: Aug. 22, 2023

(54) PRODUCT COMPOSITION WITH ANTIMICROBIAL AND IMMUNE BOOSTING ACTIVITY

(71) Applicant: RRIP, LLC, Pleasant Hill, IA (US)

(72) Inventors: Mohan Prasad A. Dasari, West Des Moines, IA (US); Abdullah A. Mahfuz, Johnston, IA (US)

(73) Assignee: RRIP, LLC, Pleasant Hill, IA (US)

( * ) Notice: Subject to any disclaimer, the term of this patent is extended or adjusted under 35 U.S.C. 154(b) by 310 days.

(21) Appl. No.: 16/130,826

(22) Filed: Sep. 13, 2018

(65) Prior Publication Data
US 2019/0075825 A1    Mar. 14, 2019

Related U.S. Application Data

(60) Provisional application No. 62/557,783, filed on Sep. 13, 2017.

(51) Int. Cl.
| | |
|---|---|
| *A23K 20/158* | (2016.01) |
| *A23K 20/105* | (2016.01) |
| *A23K 50/10* | (2016.01) |
| *A23K 50/30* | (2016.01) |
| *A23K 50/75* | (2016.01) |
| *A23D 9/007* | (2006.01) |
| *A23K 20/10* | (2016.01) |
| *A01K 1/015* | (2006.01) |

(52) U.S. Cl.
CPC ............ *A23K 20/158* (2016.05); *A23D 9/007* (2013.01); *A23K 20/10* (2016.05); *A23K 20/105* (2016.05); *A23K 50/10* (2016.05); *A23K 50/30* (2016.05); *A23K 50/75* (2016.05); *A01K 1/0152* (2013.01); *A23V 2002/00* (2013.01)

(58) Field of Classification Search
CPC ...... A23K 20/158; A23K 50/10; A23K 50/30; A23K 50/75; A23K 20/10; A23K 20/105; A23D 9/007
See application file for complete search history.

(56) References Cited

U.S. PATENT DOCUMENTS

| | | | | |
|---|---|---|---|---|
| 6,423,587 | B1 * | 7/2002 | Chen | H01L 21/28114 257/E21.205 |
| 8,741,271 | B2 * | 6/2014 | Dombeck | A01N 65/44 424/746 |
| 2012/0093952 | A1 * | 4/2012 | Frehner | A23K 20/174 424/747 |
| 2014/0357718 | A1 * | 12/2014 | Feuerstein | A23K 20/158 514/558 |
| 2016/0229793 | A1 * | 8/2016 | Dasari | C07C 213/10 |

FOREIGN PATENT DOCUMENTS

| | | |
|---|---|---|
| CN | 101938999 A | 1/2011 |
| CN | 105611840 A | 5/2016 |
| CN | 107047975 * | 8/2017 |

OTHER PUBLICATIONS

Luo et al., CN 107047975, published: Aug. 2017; English machine translation obtained Nov. 19, 2020. (Year: 2020).*

* cited by examiner

*Primary Examiner* — Genevieve S Alley
(74) *Attorney, Agent, or Firm* — Brick Gentry PC; Brian J. Laurenzo; Jessica L. Susie (57) ABSTRACT

A method is provided for treating pathogens with a lipid-based carrier and organic acids. More specifically the lipid carrier may have a pKa of 2.5-4.0 and/or may be acid oil, such as Acidulated Vegetable Oil. Furthermore, compositions consistent with the method are provided wherein the lipid-based carrier increases antipathogenic action of the organic acid. For example, the carrier may have a pKa that increases the antimicrobial action of the organic acid and/or an additional essential oil. The carrier may be acid oil, such as Acidulated Vegetable Oil derived from soapstocks and/or gums, but is not limited to same. The organic acid may include, but is not limited to, formic acid, acetic acid, propionic acid, butyric acid, and combinations thereof.

15 Claims, 11 Drawing Sheets

FIGURE 1

|  | Soybean Oil | | | |
| --- | --- | --- | --- | --- |
| Organism | 3% | 7% | 10% | 20% |
| E. coli Chi 7122 avian | | | | |
| E. coli APEC 01 avian | | | | |
| E. coli Pig ETEC 2014070732 (LT+, Sta-, Stb+) | | | | |
| E. coli Pig ETEC 2014045980 (LT-, Sta+, Stb+) | | | | |
| E. coli Pig ETEC 2014072345 (LT+, Sta+, Stb+) | | | | |
| E. coli Bovine Scours 98-9299 E23 | | | | |
| Salmonella LT2 human | | | | |
| S. enteritidis (Bovine, 96-1524, Box 42, E4) | | | | |
| S. enteritidis (Porcine, 94-2458, Box 39, F8) | | | | |
| S. enteritidis (Turkey, 94-1583, Box 39, E7) | | | | |
| Campylobacter coli 33559 swine | | | | |
| Campylobacter jejuni 33560 bovine | | | | |
| Campylobacter jejuni 700819 human | | ▨ | ■ | ■ |
| S. aureus MRSA 33591 human | | | | |
| Listeria monocytogenes (Box 78, A5) avian | | | | |
| Listeria monocytogenes (Box 76, C7) avian | | | | |

FIGURE 2

| Organism | High-Acid Tallow (HAT) | | | |
|---|---|---|---|---|
| | 3% | 7% | 10% | 20% |
| E. coli Chi 7122 avian | | | | |
| E. coli APEC 01 avian | | | | |
| E. coli Pig ETEC 2014070732 (LT+, Sta-, Stb+) | | | | |
| E. coli Pig ETEC 2014045980 (LT-, Sta+, Stb+) | | | | |
| E. coli Pig ETEC 2014072345 (LT+, Sta+, Stb+) | | | | |
| E. coli Bovine Scours 98-9299 E23 | | | | |
| Salmonella LT2 human | | | | |
| S. enteritidis (Bovine, 96-1524, Box 42, E4) | | | | |
| S. enteritidis (Porcine, 94-2458, Box 39, F8) | | | | |
| S. enteritidis (Turkey, 94-1583, Box 39, E7) | | | | |
| Campylobacter coli 33559 swine | ■ | ■ | ■ | ■ |
| Campylobacter jejuni 33560 bovine | | | | |
| Campylobacter jejuni 700819 human | | | | |
| S. aureus MRSA 33591 human | | | | |
| Listeria monocytogenes (Box 78, A5) avian | | | | ▨ |
| Listeria monocytogenes (Box 76, C7) avian | | | | ▨ |

FIGURE 3

| Organism | Distillers Corn Oil (DCO) | | | |
|---|---|---|---|---|
| | 3% | 7% | 10% | 20% |
| E. coli Chi 7122 avian | | | | |
| E. coli APEC 01 avian | | | | |
| E. coli Pig ETEC 2014070732 (LT+, Sta-, Stb+) | | | | |
| E. coli Pig ETEC 2014045980 (LT-, Sta+, Stb+) | | | | |
| E. coli Pig ETEC 2014072345 (LT+, Sta+, Stb+) | | | | |
| E. coli Bovine Scours 98-9299 E23 | | | | |
| Salmonella LT2 human | | | | |
| S. enteritidis (Bovine, 96-1524, Box 42, E4) | | | | |
| S. enteritidis (Porcine, 94-2458, Box 39, F8) | | | | |
| S. enteritidis (Turkey, 94-1583, Box 39, E7) | | | | |
| Campylobacter coli 33559 swine | ■ | ■ | ■ | |
| Campylobacter jejuni 33560 bovine | | | | |
| Campylobacter jejuni 700819 human | | | | |
| S. aureus MRSA 33591 human | | | | |
| Listeria monocytogenes (Box 78, A5) avian | | | | |
| Listeria monocytogenes (Box 76, C7) avian | | | | |

FIGURE 4

| Organism | Propionic Acid in AVO (ppm) | | | |
|---|---|---|---|---|
| | 300 | 700 | 1500 | 2000 |
| E. coli Chi 7122 avian | | ■ | ■ | ■ |
| E. coli APEC 01 avian | | ■ | ■ | ■ |
| E. coli Pig ETEC 2014070732 (LT+, Sta-, Stb+) | | ■ | ■ | ■ |
| E. coli Pig ETEC 2014045980 (LT-, Sta+, Stb+) | | ■ | ■ | ■ |
| E. coli Pig ETEC 2014072345 (LT+, Sta+, Stb+) | | ■ | ■ | ■ |
| E. coli Bovine Scours 98-9299 E23 | | ■ | ■ | ■ |
| Salmonella LT2 human | | ■ | ■ | ■ |
| S. enteritidis (Bovine, 96-1524, Box 42, E4) | | ■ | ■ | ■ |
| S. enteritidis (Porcine, 94-2458, Box 39, F8) | | ■ | ■ | ■ |
| S. enteritidis (Turkey, 94-1583, Box 39, E7) | | ■ | ■ | ■ |
| Campylobacter coli 33559 swine | | | ■ | ■ |
| Campylobacter jejuni 33560 bovine | | | ■ | ■ |
| Campylobacter jejuni 700819 human | | | ■ | ■ |
| S. aureus MRSA 33591 human | | | | ■ |
| Listeria monocytogenes (Box 78, A5) avian | | | ▨ | ■ |
| Listeria monocytogenes (Box 76, C7) avian | | | ▨ | ■ |

| Organism | Propionic Acid in DCO (ppm) | | | |
|---|---|---|---|---|
| | 300 | 700 | 1500 | 2000 |
| E. coli Chi 7122 avian | | | ■ | ■ |
| E. coli APEC 01 avian | | ■ | ■ | ■ |
| E. coli Pig ETEC 2014070732 (LT+, Sta-, Stb+) | | ■ | ■ | ■ |
| E. coli Pig ETEC 2014045980 (LT-, Sta+, Stb+) | | ■ | ■ | ■ |
| E. coli Pig ETEC 2014072345 (LT+, Sta+, Stb+) | | | ■ | ■ |
| E. coli Bovine Scours 98-9299 E23 | | | ■ | ■ |
| Salmonella LT2 human | | ■ | ■ | ■ |
| S. enteritidis (Bovine, 96-1524, Box 42, E4) | | | ■ | ■ |
| S. enteritidis (Porcine, 94-2458, Box 39, F8) | | | ■ | ■ |
| S. enteritidis (Turkey, 94-1583, Box 39, E7) | | | ■ | ■ |
| Campylobacter coli 33559 swine | | ■ | ■ | ■ |
| Campylobacter jejuni 33560 bovine | | ■ | ■ | ■ |
| Campylobacter jejuni 700819 human | | ■ | ■ | ■ |
| S. aureus MRSA 33591 human | | | ■ | ■ |
| Listeria monocytogenes (Box 78, A5) avian | | ■ | ■ | ■ |
| Listeria monocytogenes (Box 76, C7) avian | | ■ | ■ | ■ |

FIGURE 8

| Organism | Acetic Acid in AVO (ppm) | | | |
|---|---|---|---|---|
| | 300 | 700 | 1500 | 2000 |
| E. coli Chi 7122 avian | | ■ | ■ | ■ |
| E. coli APEC 01 avian | | ■ | ■ | ■ |
| E. coli Pig ETEC 2014070732 (LT+, Sta-, Stb+) | | ■ | ■ | ■ |
| E. coli Pig ETEC 2014045980 (LT-, Sta+, Stb+) | | ■ | ■ | ■ |
| E. coli Pig ETEC 2014072345 (LT+, Sta+, Stb+) | | ■ | ■ | ■ |
| E. coli Bovine Scours 98-9299 E23 | | ■ | ■ | ■ |
| Salmonella LT2 human | | ■ | ■ | ■ |
| S. enteritidis (Bovine, 96-1524, Box 42, E4) | | ■ | ■ | ■ |
| S. enteritidis (Porcine, 94-2458, Box 39, F8) | | ■ | ■ | ■ |
| S. enteritidis (Turkey, 94-1583, Box 39, E7) | | | ■ | ■ |
| Campylobacter coli 33559 swine | | ■ | ■ | ■ |
| Campylobacter jejuni 33560 bovine | | ■ | ■ | ■ |
| Campylobacter jejuni 700819 human | | ■ | ■ | ■ |
| S. aureus MRSA 33591 human | | | ■ | ■ |
| Listeria monocytogenes (Box 78, A5) avian | | ■ | ■ | ■ |
| Listeria monocytogenes (Box 76, C7) avian | | ■ | ■ | ■ |

FIGURE 9

| Organism | Formic Acid in AVO (ppm) | | | |
|---|---|---|---|---|
| | 300 | 700 | 1500 | 2000 |
| E. coli Chi 7122 avian | | ■ | ■ | ■ |
| E. coli APEC 01 avian | | ■ | ■ | ■ |
| E. coli Pig ETEC 2014070732 (LT+, Sta-, Stb+) | | ■ | ■ | ■ |
| E. coli Pig ETEC 2014045980 (LT-, Sta+, Stb+) | | ■ | ■ | ■ |
| E. coli Pig ETEC 2014072345 (LT+, Sta+, Stb+) | | ■ | ■ | ■ |
| E. coli Bovine Scours 98-9299 E23 | | ■ | ■ | ■ |
| Salmonella LT2 human | | ■ | ■ | ■ |
| S. enteritidis (Bovine, 96-1524, Box 42, E4) | | ■ | ■ | ■ |
| S. enteritidis (Porcine, 94-2458, Box 39, F8) | | ■ | ■ | ■ |
| S. enteritidis (Turkey, 94-1583, Box 39, E7) | | ■ | ■ | ■ |
| Campylobacter coli 33559 swine | | ■ | ■ | ■ |
| Campylobacter jejuni 33560 bovine | | ■ | ■ | ■ |
| Campylobacter jejuni 700819 human | ■ | ■ | ■ | ■ |
| S. aureus MRSA 33591 human | | ■ | ■ | ■ |
| Listeria monocytogenes (Box 78, A5) avian | | ■ | ■ | ■ |
| Listeria monocytogenes (Box 76, C7) avian | | ■ | ■ | ■ |

PRODUCT COMPOSITION WITH ANTIMICROBIAL AND IMMUNE BOOSTING ACTIVITY

FIELD OF THE INVENTION

This invention relates generally to compositions and methods for antimicrobial and immune boosting activity in animal industries, as well as promotion of digestive health and overall performance and production. More specifically, the invention relates to antimicrobial compositions and methods that mitigate pathogens in animal feed, animal environment including but not limited to air, water, and litter, and the animal gastrointestinal system.

BACKGROUND

Antimicrobial products are desirable for animals in several different forms and media. In one example, antimicrobial products may be ingested by an animal, such as via animal feed, supplements, nutraceuticals, or water. In such cases, the antimicrobial products may treat and prevent infection, promote gut health, decrease mortality, and increase weight gain and other measurements of health and productivity. In other cases, antimicrobial products may be used in the animal's habitat or environment, such as on animal litter to prevent infections. Pathogens of concern include, but are not limited to, strains of *Escherichia coli* (*E. coli*), *Salmonella* including but not limited to *Salmonella enteritidis* (*S. enteritidis*), *Campylobacter coli*, *Campylobacter jejuni*, *Staphylococcus aureus*, *Listeria monocytogenes*, worms, PEDv, PPRS and other viruses. Moreover, applicable animal industries include, but are not limited to, the poultry, beef, and pork industries.

Traditionally, in addition to vaccinating the animals for specific microbial pathogens, producers usually use specific chemicals such as formaldehyde, chlorine dioxide, etc. for pathogen mitigation. These chemicals are not only unsafe to handle but also pose health hazards for both human beings and animals. Furthermore, these chemicals need special equipment for storage and dosing into feed. These chemicals are quickly becoming undesirable in animal industries.

Organic acids and natural substances of plant origin are believed to be safer and healthier and are not considered chemical hazards as compared to synthetic substances. Organic acids and active components of herbs and herbal products can be incorporated in animal diets to replace synthetic products to stimulate or promote the immune functions, improve gut morphology, mitigate infection processes, increase oxidation stability in tissues, promote self-defense against harmful pathogens in the gut and effective use of feed nutrients which may subsequently result in more rapid body weight gain, higher production rates and improved feed efficiency.

Nonetheless, organic acids and active components of herbs and herbal products have drawbacks which make their use for antimicrobial purposes with animals difficult. First, the dosages of organic acids and herb products that are required for these purposes are large. In such large dosages, the organic acids are very pungent. This often prevents animals from eating feed or other material including the acids. Moreover, it creates an undesirable environment. To counteract the odor and make the acids more appealing for consumption, the acids can be buffered with a base, including but not limited to ammonia. However, neutralization reduces the efficacy of the organic acids for antimicrobial purposes. Accordingly, while organic acids and essential oils are known to have some antimicrobial characteristics and gut health benefits, the dosage amount and the mode of administration lead them to be not very effective in realizing their benefits in animals. Therefore, organic acids are not popular among growers due to the lack of efficacy.

Omega-3 and DHA components are known improve the immune system and reduce the internal inflammation in the gut. Also known to be used for antimicrobial purposes are medium chain fatty acids (MCFAs). In one previous example, European Patent Reference No. EP1314358 discloses an antimicrobial composition for animals. The composition includes an MCFA component and at least one growth-promoting component. The growth-promoting component may be an organic acid, inorganic acid, animal feed, antibiotic, conventional growth promotor, or plant extract. In another example, U.S. Pat. No. 9,808,476 provides a feed supplement comprising oligosaccharides and MCFAs. More specifically, the oligosaccharide is a homotrimer, heterotrimer, homotetramer, and/or heterotetramer of a pentose saccharide, hexose saccharide, glucuronic acid, and/or galacturonic acid. Moreover, the MCFA is selected from caproic, caprylic, capric, and lauric acids. Another reference, 2017/0354167 discusses chemical mitigants in animal feed and feed ingredients including at least one MCFA having an aliphatic tail of 6 to 12 carbon atoms and an essential oil. European Patent Reference No. EP1089635 focuses on animal feed containing oils having a high lauric acid content.

Unites States Patent Application Publication No. 2014/0037698A1 discusses additives for animal food. Organic acid salts and ingredients of plant origin are protected with vegetable fats and/or oils. Namely, the protection is from stomach enzymes. Therefore, the fats and oils regulate the digestion of the additive. U.S. Pat. No. 8,980,335 discloses C18, C20, and C22 polyunsaturated acids as feed additives.

Vegetable oil refining produces byproducts, as do other industries. One by-product of these industries is an oil having large amounts of free fatty acids. This oil may be termed "acid oil" or simply "fatty acids". The term "Acidulated Vegetable Oil" (AVO) is often used in this disclosure to refer to all fats and oils which are byproducts of vegetable oil refining and which have high free fatty acid contents. Oftentimes, acid oil, including but not limited to Acidulated Vegetable Oil (sometimes "AVO"), is derived from oil refinery byproducts such as soapstocks, gums, etc. and is extracted via acidulation and hydrolysis processes. A carefully processed AVO contains a significant level of free fatty acids which maintain a certain range of pH (typically 2.5-4.0) in the oil and have a pKa of 2.5-4.0. Moreover, the term "acid oil" is used in this disclosure to refer to all types of fats and oils having a high free fatty acid content, whether from vegetable oil refining, the animal industry, waste oils, or other sources. AVO is an example of an acid oil, as the phrase is used in this disclosure.

Needed in the art is a safe, easy to handle product with antipathogenic properties and methods for same. Such a product should have antibacterial, antifungal, antiviral, and/or mold inhibiting properties. Pathogens of interest include, but are not limited to, *Salmonella*, *E. coli*, *Campylobacter*, *Listeria*, *clostridium*, worms, and PEDv. Preferably, such a product should easily disperse in feed, water, and/or an animal environment and have no adverse effects on its surroundings. In feed, such a product and methods should have no adverse effects on carbohydrates, proteins, and vitamins, for example. Preferably, the product will increase palatability of feed. Moreover, the product and methods may create, balance, and maintain a favorable environment for beneficial gut bacteria and promote overall digestive health.

A further benefit may include increased immune functions in a target animal. The product and methods may have antipathogenic effects on animals themselves, animal feed, animal water, and/or animal litter. Such a product may also provide energy, including but not limited to essential fatty acids. Moreover, the product and methods may result in increased feed intake.

SUMMARY OF THE INVENTION

In a first embodiment of the invention, a composition is provided comprising acid oil having free fatty acids and at least one organic acid. The pKa of the acid oil may range from 2.5 to 4.0. Moreover, the acid oil may include at least 40% free fatty acids. The acid oil may be Acidulated Vegetable Oil. The composition may further include at least one plant extract, such as an essential oil. The essential oil may be selected from the group consisting of cinnamon oil, oregano oil, clove oil, thyme oil, and combinations thereof. Moreover, the acid oil may be selected from the group consisting of Acidulated Vegetable Oil, soybean fatty acids, corn fatty acids, palm fatty acids, coconut fatty acids, tallow fatty acids, and combinations thereof. The organic acid may be selected form the group consisting of formic acid, acetic acid, propionic acid, butyric acid, and combinations thereof. The composition may include additional fats and/or oils. The pKa of the acid oil and additional fats and oils together may range from 2.5 to 4.0.

In another embodiment of the invention, a method for treating pathogens is provided. The method includes treating the pathogens with a composition comprising acid oil having free fatty acids and at least one organic acid. The pKa of the acid oil may range from 2.5 to 4.0. Moreover, the acid oil may be at least 40% free fatty acids. Treatment may occur by ingestion by an animal, such as a chicken, turkey, cow, or pig. The composition may further comprise at least one plant extract. The acid oil may increase the antimicrobial action of the organic acid. In some embodiments, the treatment may occur in animal litter and/or water. In other embodiments, the composition is applied to animal feed.

In yet a further embodiment, a composition is provided. The composition includes a lipid-based carrier having a pKa ranging from 2.5 to 4.0 and an organic acid.

DETAILED DESCRIPTION

This invention relates to compositions and methods for mitigating pathogens and improving health and productivity in the animal industry. Compositions and methods of the present invention may promote digestive and immune health, as well as overall performance and production in animals. In some examples, the compositions and methods may be applicable to animal feeds, supplements, nutraceuticals, and/or water. In other embodiments, the compositions and methods may be applicable to the environment in which the animal lives, such as litter. In a first embodiment, a composition is provided that includes a lipid-based carrier having a pKa ranging from 2.5-4.0 and an organic acid. For example, the composition may include acid oil and at least one organic acid. In other embodiments, methods for treating pathogens are provided wherein the pathogens are treated with acid oil including free fatty acids and at least one organic acid. In some embodiments, the composition and methods may further comprise a plant extract, such as an essential oil and/or herbal extract.

As discussed in further detail below, novel aspects of the invention include utilizing a target pKa of the carrier to increase antimicrobial action of at least one organic acid. The lipid-based carrier may be any fats and/or oils having the necessary pKa. In some embodiments, the lipid-based carrier includes fats and oils derived from vegetable oil refinery byproducts, such as acid oil. One such byproduct is Acidulated Vegetable Oil. The carrier may be a mixture of different types of fatty acids of different sizes, or may be a single type of lipid as desired. Other lipid-based carriers include, but are not limited to, soybean fatty acids, corn fatty acids, coconut fatty acids, palm fatty acids, tallow fatty acids, and others. The pKa of the acid oil may range from 2.5 to 4.0. To this end, Acidulated Vegetable Oil is often preferred, as it naturally has the target pKa. In some embodiments, the pKa of the fats and oils may be adjusted prior to treatment, such as lowered to the target range. The acid oil acts as a carrier and also increases the antimicrobial action of the organic acids. Any type of lipid-based carrier may be used without departing from the scope of the invention, including carriers derived from other types of fats and oils. In some embodiments, acid oil having an appropriate pKa is mixed with other fats and oils, which also can act as a carrier and aid in dispersal of the composition. The resulting lipid-based mixture will preferably have the target pKa. The fats and oils may be selected from the group consisting of vegetable oil, corn oil, soybean oil, tallow, and combinations thereof. The invention improves animal immune function, gut integrity, gastrointestinal microflora, feed efficiency/feed conversion, overall health, performance, production, mortality rates, and body weight gain, among other benefits.

Both the acid oil and the organic acids are carboxylic acids. Accordingly, compositions and methods of the present invention may include a mixture of carboxylic acids. Carboxylic acids of any size may be used. In preferred embodiments, the acids range in size from formic acid at the small end to C29 carboxylic acids. In addition, preferably the lipid-based carrier includes free fatty acids, as are common in acid oils such as Acidulated Vegetable Oil. The carrier may include at least 40% free fatty acids. Moreover, the composition may include at least one plant extract, such as an essential oil. The essential oil may be cinnamon oil, oregano oil, clove oil, thyme oil, or combinations thereof. The organic acid may be, but is not limited to, formic acid, acetic acid, propionic acid, butyric acid, and combinations thereof. In preferred embodiments, lipid-based carrier and organic acid increase the antimicrobial action of each other. In other embodiments, the lipid-based carrier may increase the antimicrobial action of the organic acid and/or a plant extract, if used. More specifically, the carrier has a pKa that increases the antimicrobial action of at least one of the organic acid and plant extract.

As discussed above, it has heretofore been difficult to treat animals and their environment with organic acids for antimicrobial purposes due to the high dosages that must be used. First, employing enough organic acids for this purpose can be cost prohibitive, as organic acids are expensive. Second, the acids are pungent. To use enough organic acid to be effective for antimicrobial purposes, the amount used would create an offensive odor. If used in feed or otherwise ingested, the odor is often unappetizing to the animal. Moreover, if used in the animal's environment, the smell can be offensive for both animals and people in the industry. To address this issue in the past, the organic acids have been mixed with bases such as ammonia. This reduces the acidity of the organic acid, which in turn reduces the efficacy. The pH and/or pKa of the acids are critical for efficacy for antimicrobial purposes.

Moreover, lipid-based carriers such as acid oil provide a medium in which to disperse the organic acids and provides an appropriate pKa to increase the antimicrobial action of the organic acid and/or essential oils. In one example, the lipid-based carrier, organic acid, and essential oil (if using) may be mixed and sprayed onto animal feed. The acid oil allows the mixture to mix throughout the entire feed, whereas if the organic acid and/or essential oil are added directly to feed, dispersion does not occur.

The oil is at the appropriate, low pH and pKa to increase the antimicrobial action of the organic acid to a level beyond that which would be expected when mixing the two substances. As such, the compositions, methods, and results of the present invention are unexpected. Moreover, it is unexpected that organic acids and natural products, such as herbal extracts and essential oils increase the antimicrobial action of the fats and oils. While many fats and oils that are not high in free fatty acids (such as acid oil) typically do not have the pKa necessary to increase the antimicrobial effect of organic acids, the pKa of those fats and oils may be adjusted. For example, acid oil may be mixed with other types of fats and oils, such that the resulting mixture retains the pKa of the acid oil or is otherwise in the target range. Due to the resulting pKa, such a mixture would exhibit many, if not all, of the benefits of using acid oil alone. Moreover, such a mixture can be more economical, as acid oil may be used in smaller quantities. It is further anticipated that other acids, such as non-organic acids, may be used to adjust the pKa of fats and oils without departing from the scope of the invention.

Acid oil such as Acidulated Vegetable Oil usually has a pKa in the range of 2.5-4.0, and more specifically sometimes 2.5-3.0 while organic acids usually are in the pKa range of 3.5-5.0. When blended with each other, the pKa of the final blend remains around 2.5-4.0. At this lower pKa, the organic acids can effectively dissociate, thereby releasing H+ ions, resulting in acidification of the entire medium. When blended with Acidulated Vegetable Oil, organic acids show higher efficacy as opposed to by themselves. A blend of Acidulated Vegetable Oil with organic acids and essential oils will allow for a uniform distribution of these micro ingredients onto the feed matrix and as a result will be consistently consumed by the animals. The level of free fatty acids and the pH range of AVO offers better absorption, maintains the abdominal pH level of animals, and is desirable for good bacteria (such as lactobacillus) but undesirable for harmful bacterial such as salmonella, *E. coli, campylobacter, listeria, clostridium.*

The interaction of the Acidulated Vegetable Oil, or another suitable lipid-based carrier, with the organic acid and/or essential oil is unexpected. Specifically, it is unexpected that acid oil, such as Acidulated Vegetable Oil, that is produced from soapstock, gums, and/or similar vegetable oil refining byproducts would have efficacy in mitigating certain pathogens. It is further unexpected that this efficacy can be significantly improved when mixed with organic acids and/or essential oils and also that the efficacy of the organic acids and/or essential oils for antimicrobial action can be increased when mixed with Acidulated Vegetable Oil.

Accordingly, a composition can be created including a lipid-based carrier having a pKa of 2.5-4.0 and an organic acid. In some embodiments, a plant extract may be included, such as an essential oil. The lipid-based carrier having a pKa of 2.5-4.0 increases the antimicrobial efficacy of the organic acid. More specifically, a pKa of 2.5-3.0 may be used. This prevents the need to use large doses of organic acids and/or buffer same. However, it is anticipated that other factors will contribute to the selection of the carrier depending on the application, as will be understood by one of skill in the art. As noted above, in some embodiments, the carrier is acid oil, such as Acidulated Vegetable Oil, which is derived from soapstocks and/or gums, such as wet gums and/or dry gums, from the vegetable oil refining process. A composition of the present invention may include two or more organic acids and/or two or more essential oils. Moreover, a composition of the present invention can be tailored based on how the acids and oils interact with a particular animal's body, the strain(s) of pathogens at issue, and the application, as discussed in further detail below. The composition may also be tailored based on other factors, as will be apparent to one of skill in the art.

Tables 1-3 below show preferred compositions for pathogen control purposes of the present invention wherein the composition is designed to be blended with animal feed. The organic acid is selected form the group consisting of formic acid, acetic acid, propionic acid, butyric acid, and combinations thereof.

TABLE 1

A first embodiment of a preferred composition of the present invention.

| Ingredients | % Ingredients in Blend |
|---|---|
| AVO | 98.00% |
| Butyric Acid | 0.20% |
| Acetic Acid | 0.80% |
| Formic Acid | 0.50% |
| Cinnamon oil | 0.50% |

TABLE 2

A second embodiment of a preferred composition of the present invention.

| Ingredients | % Ingredients in Blend |
|---|---|
| AVO | 55.00% |
| Distiller corn oil | 42.00% |

TABLE 2-continued

A second embodiment of a preferred composition of the present invention.

| Ingredients | % Ingredients in Blend |
|---|---|
| Acetic Acid | 1.00% |
| Formic Acid | 0.80% |
| Propionic Acid | 1.20% |

TABLE 3

A third embodiment of a preferred composition of the present invention.

| Ingredients | % Ingredients in Blend |
|---|---|
| AVO | 95.00% |
| Acetic Acid | 1.30% |
| Formic Acid | 1.00% |
| Propionic Acid | 2.00% |
| Oregano oil | 0.700% |

Compositions and methods of the present invention have numerous benefits and applications. First, the compositions may be ingested by an animal, such as via feed, water, an additive, a supplement, combinations thereof, or another means of ingestion. When ingested, compositions and methods may be used to increase palatability of the feed or other product, leading to increased feed intake. The compositions may be used to treat an existing infection, prevent future infections, and/or promote gut health. With respect to gut health, the compositions may protect the intestinal tract from infectious pathogens and/or create a favorable environment for the beneficial bacteria in the gut. In preferred embodiments, there are no adverse effects on beneficial bacteria. The composition may balance the gut microflora population, as well as maintain gut pH. Thus, compositions and methods of the present invention may support a healthy digestive system. Cocci load in the gut may be reduced. The positive effects on gut health lead to better digestion, absorption, and utilization of nutrients.

Moreover, the compositions and methods may be used to increase health generally and, possibly gradually, over time. Moreover, the present invention may increase performance and production of all animals. Performance may be maintained during heat stress. Preferred embodiments provide energy, essential fatty acids, and an antioxidant effect. Moreover, immune function may be increased. In some examples, the composition may be used to treat a particular pathogen for a limited period, and in other examples, the composition may be used to increase health on a long-term basis. Accordingly, the composition could be an additive to food or water, supplement, and/or animal feed. It is further anticipated that including such a composition in animal feed and/or water may also have the effect of mitigating pathogens in the feed and/or water itself. Compositions of the present invention may be easily applied to many media, such as animal feed, water, and litter and result in effective dispersion of the organic acid (and other additives) via the carrier in the media. Such a dispersion method positively affects dust control.

An acidic environment favors growth of beneficial bacteria and discourages growth of pathogenic bacteria. Acidulated vegetable oil with organic acids and essential oils will enter the pathogenic bacteria, thus impairing cellular metabolic function, preventing replication of bacteria and/or causing the pathogenic bacteria to die. Moreover, the present invention can improve immunity. In those methods, rather than curing disease, animals are prevented from developing such diseases based on their innate resistance. In addition, the present invention can improve gut morphology and, therefore, may help reduce inflammation and bird lameness. This is a result of higher supplemental energy sources available for improved feed conversion, daily rate of gain, and enhancement of the extra caloric effect which improves animal usability of all feed ingredients, etc.

Feed and ingestion are only examples of ways in which animals and their environments can be infected with pathogens and, accordingly, benefit from compositions and methods of the present invention. In other embodiments, the compositions may also be applied to the animal or the animal's environment to mitigate pathogens. In the animal's environment, the composition may be used to mitigate pathogens that would otherwise infect and propagate throughout the environment, including but not limited to the air, water, feed, and the animals themselves. In one example, the composition may be applied to an animal's litter to prevent pathogen growth related to feces, etc. The composition may also be applied to the flock and animals themselves. In yet another example, such a composition may be employed at a meat processing plant to mitigate pathogens, such as by spraying.

EXAMPLES

The following examples illustrate the present invention in more detail and are illustrative of how the invention described herein may be implemented.

Example 1

Experiments were carried out to determine the antibacterial properties of various fats and oils of interest, including Acidulated Vegetable Oil, high-acid tallow, and distillers corn oil. Soybean oil was used as a control. FIGS. 1-4 show the antipathogenic effect of acid oil, soybean oil, high-acid tallow, and distillers corn oil. To test the antimicrobial action of the substances, experiments were designed to grow cultures of the various pathogen strains in vitro in petri dishes. Various dosages of the experimental substances were added to petri dishes with the strains indicated in the figures. It was then observed whether cultures grew. In the figures, white indicates growth, gray indicates some growth, and black indicates no growth. Accordingly, black indicates good antimicrobial action, while gray indicates some antimicrobial action. The acid oil is Acidulated Vegetable Oil with a pKa of 2.5-4.0. The soybean oil is from a vegetable oil refinery with a pKa of 6.0-6.5. The high-acid tallow is tallow with an acid treatment and has a pKa of 4.0-5.0. Lastly, the distillers corn oil is from an ethanol plant and has a pKa of 5.0-5.5. At higher concentrations, soybean oil has antimicrobial effect on two *Campylobacter jejuni* strains. Partial effect is shown for one strain at lower concentrations. Distillers corn oil and high-acid tallow show increased effectiveness on all tested *Campylobacter* strains, while high-acid tallow also shows partial effectiveness for *Listeria monocytogenes* at high concentrations. Acid oil performs the best, showing partial or full effectiveness against some *E. coli* strains, *Salmonella*, *Campylobacter* strains, *S. aureus* MRSA, and *Listeria monocytogenes*, including at low concentrations.

Figure 1:
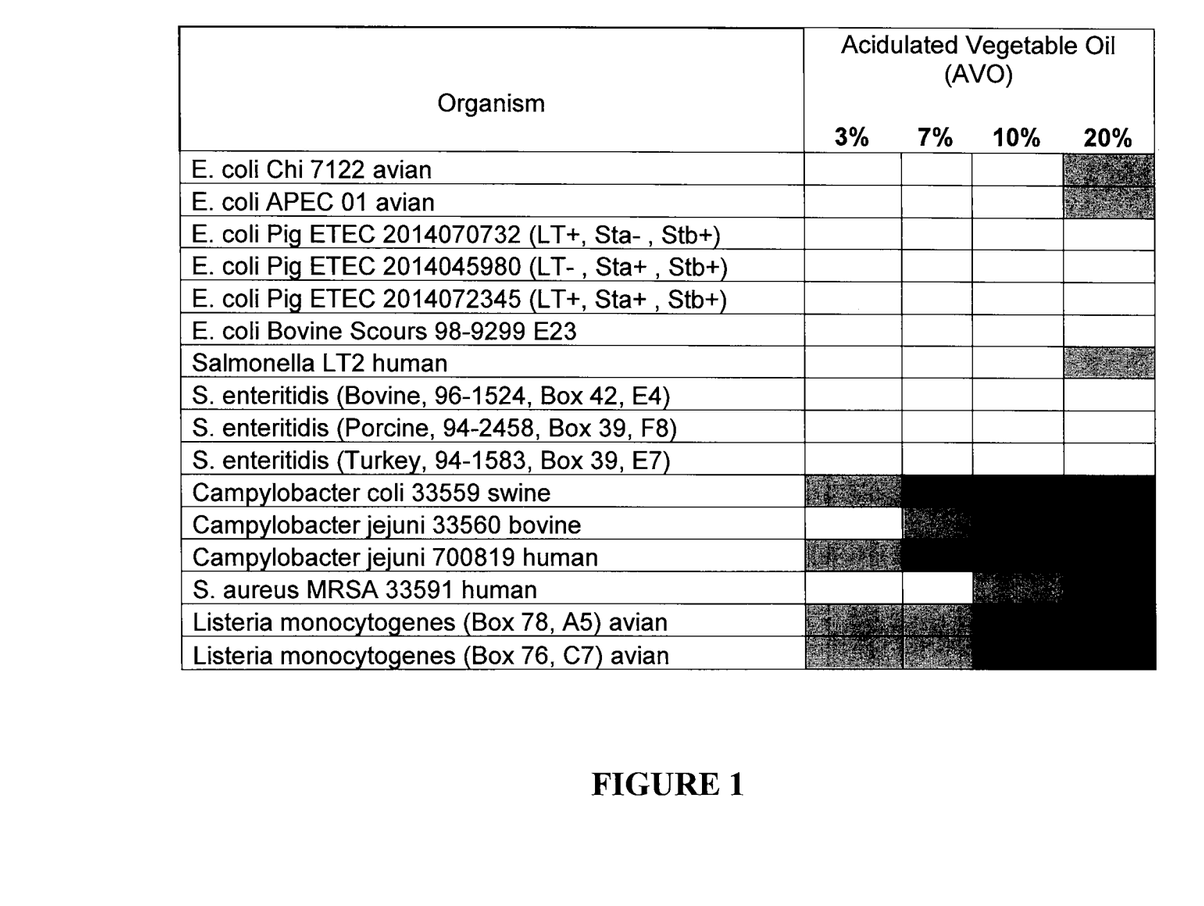
FIG. 1 is a table showing the antimicrobial activity of Acidulated Vegetable Oil.
Figure 2:
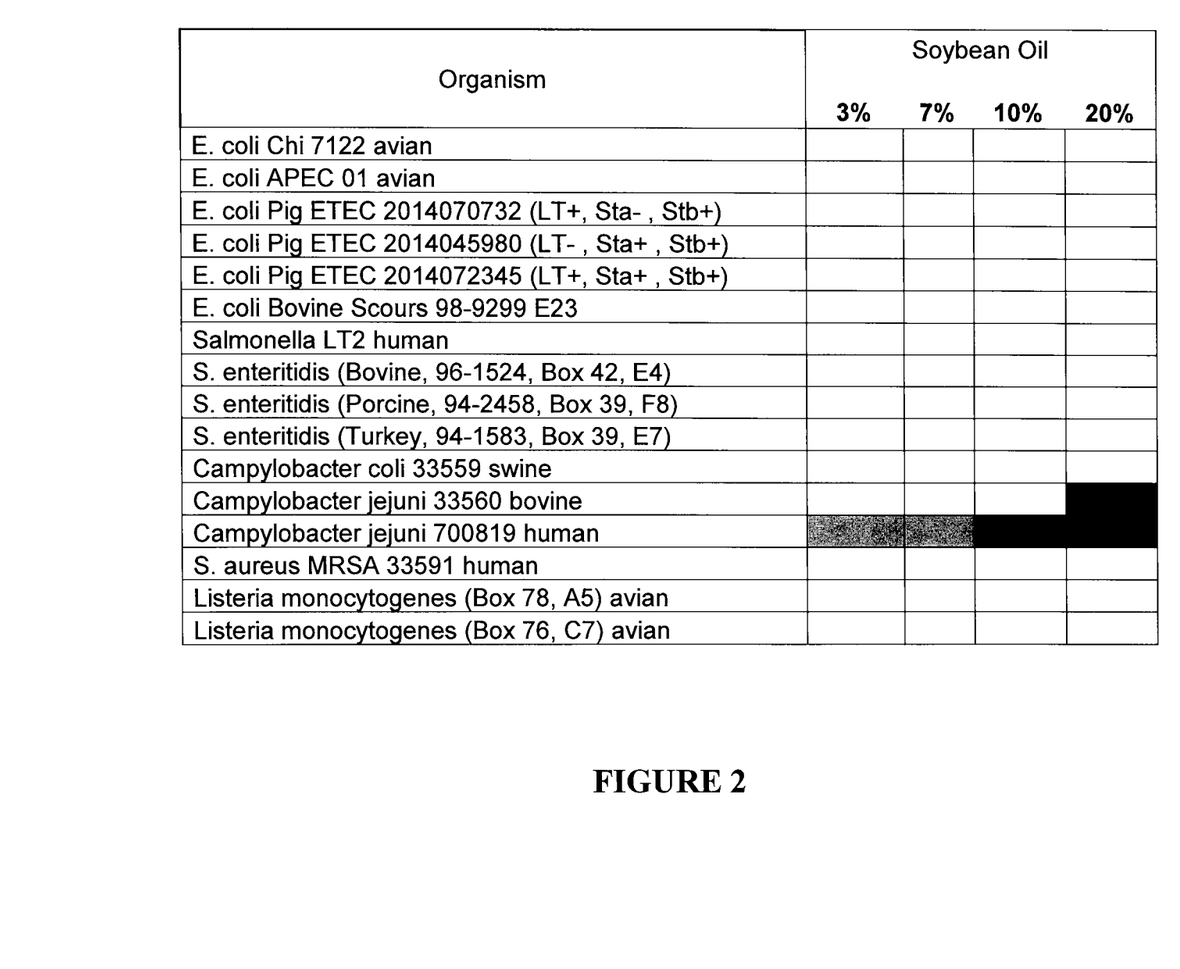
FIG. 2 is a table showing the antimicrobial activity of soybean oil.
Figure 3:
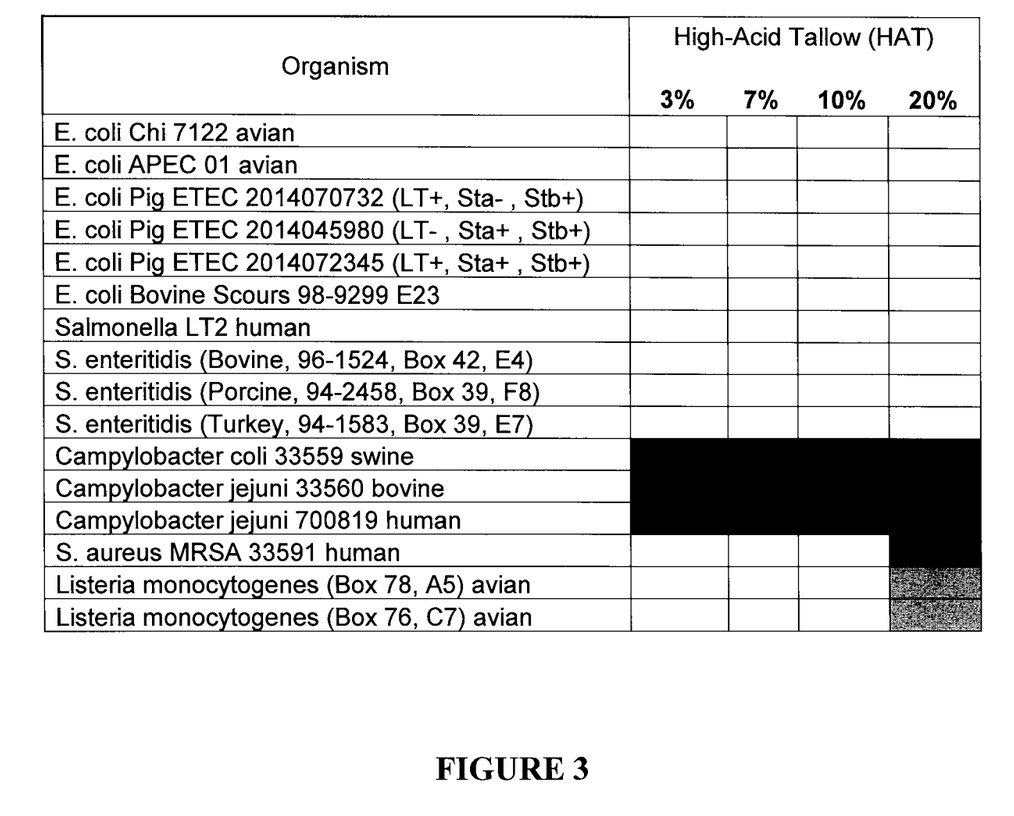
FIG. 3 is a table showing the antimicrobial activity of high-acid tallow.
Figure 4:
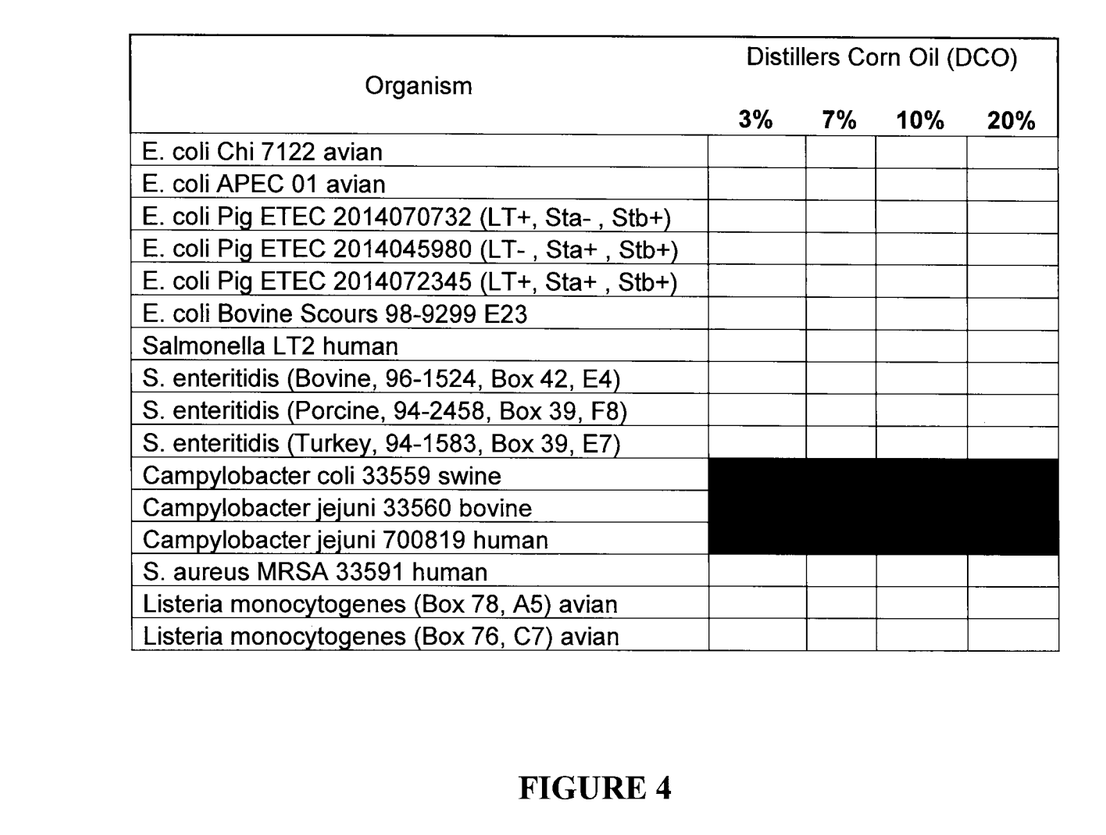
FIG. 4 is a table showing the antimicrobial activity of distillers corn oil.
Figure 5:
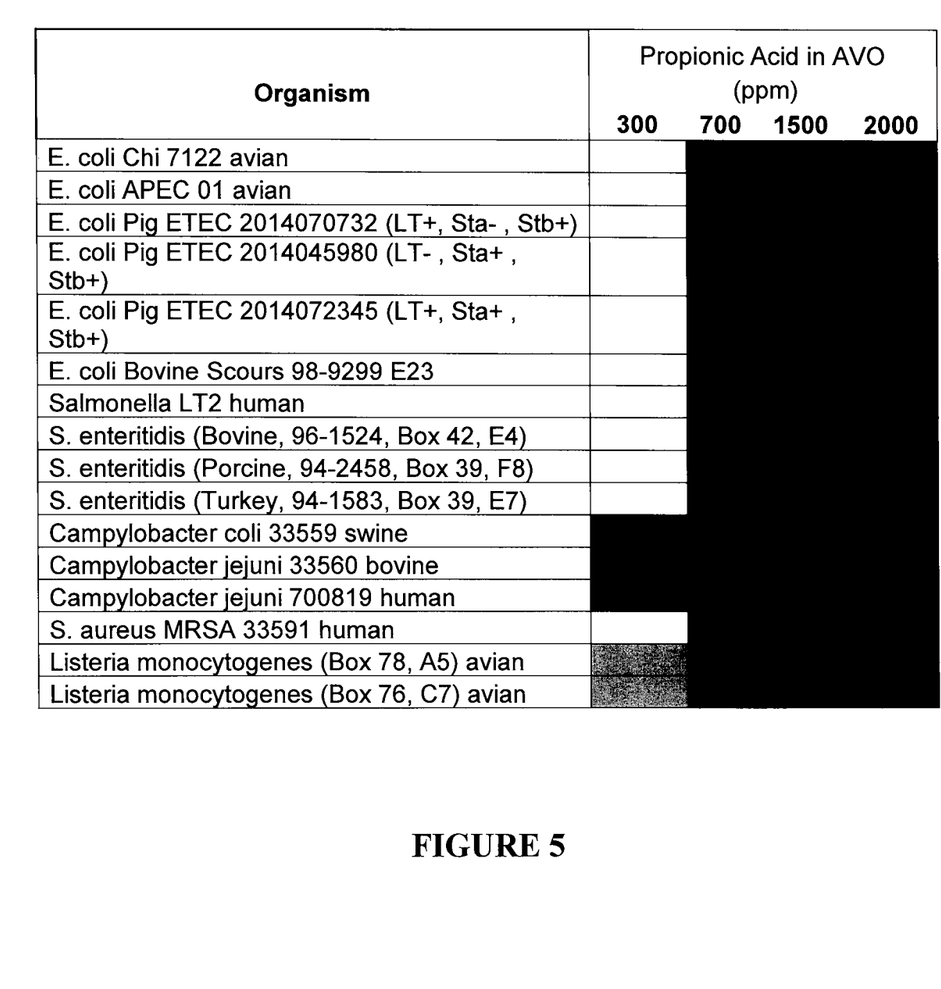
FIG. 5 is a table showing the antimicrobial activity of organic acid blend mixed with Acidulated Vegetable Oil.
Figure 6:
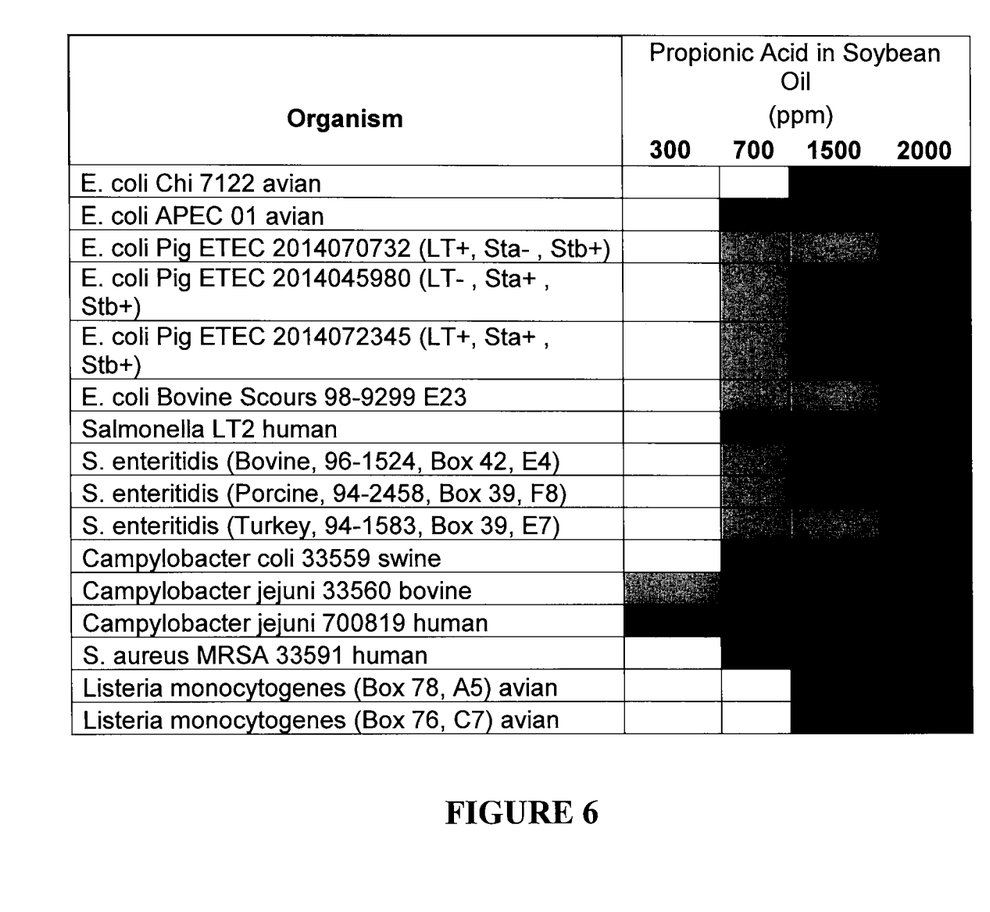
FIG. 6 is a table showing the antimicrobial activity of propionic acid mixed with soybean oil.
Figure 7:
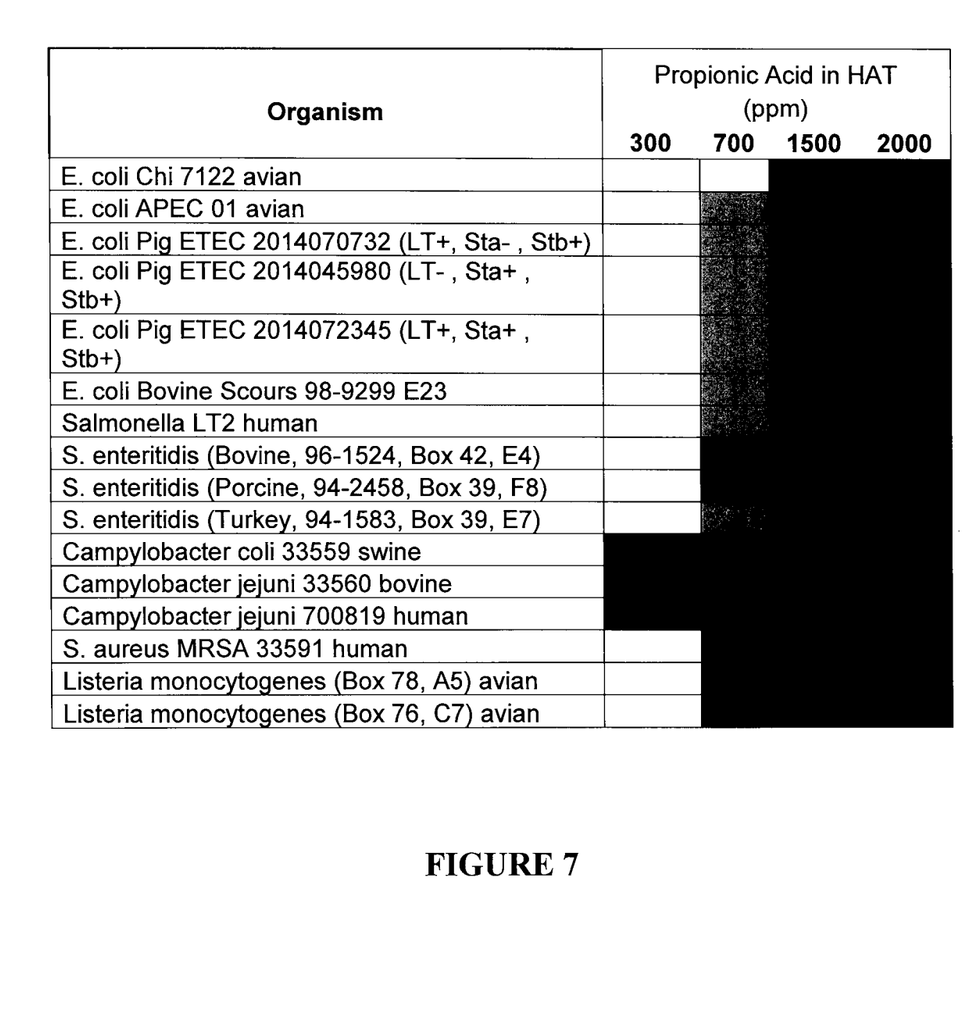
FIG. 7 is a table showing the antimicrobial activity of propionic acid mixed with high-acid tallow.
Figure 8:
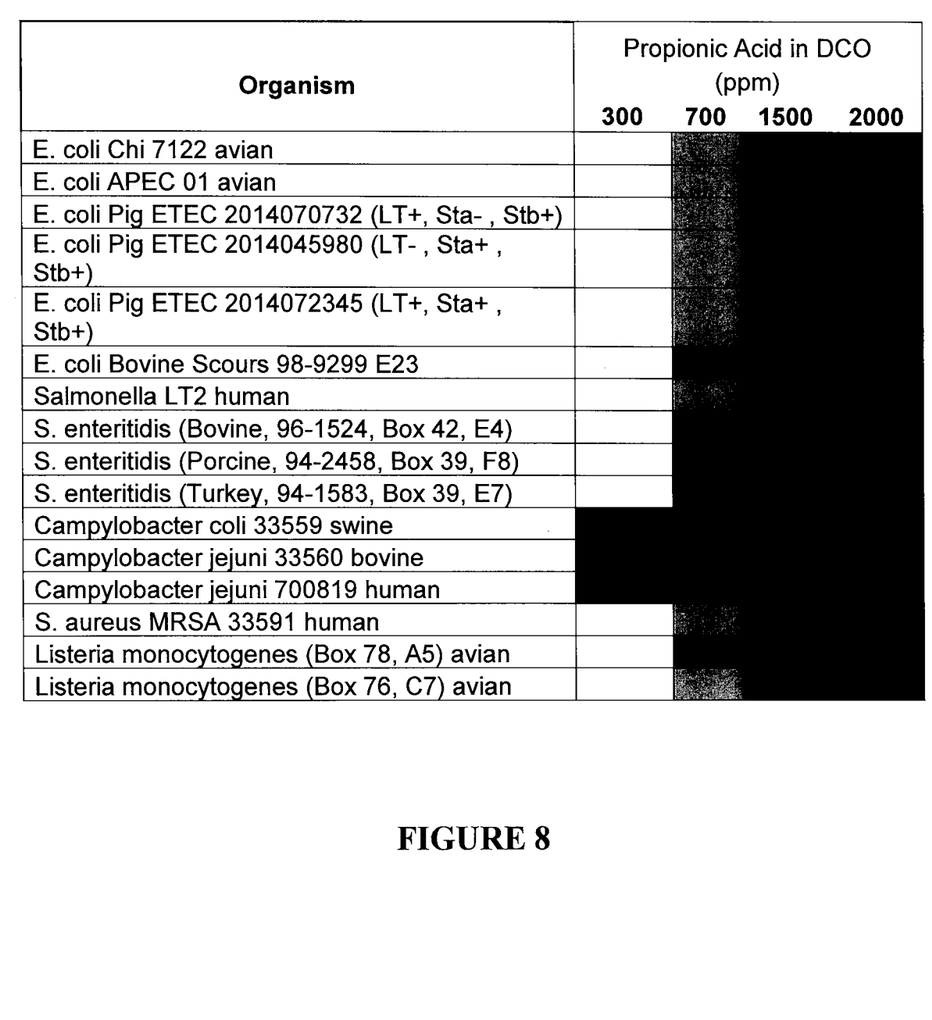
FIG. 8 is a table showing the antimicrobial activity of propionic acid mixed with distillers corn oil.
Figure 9:
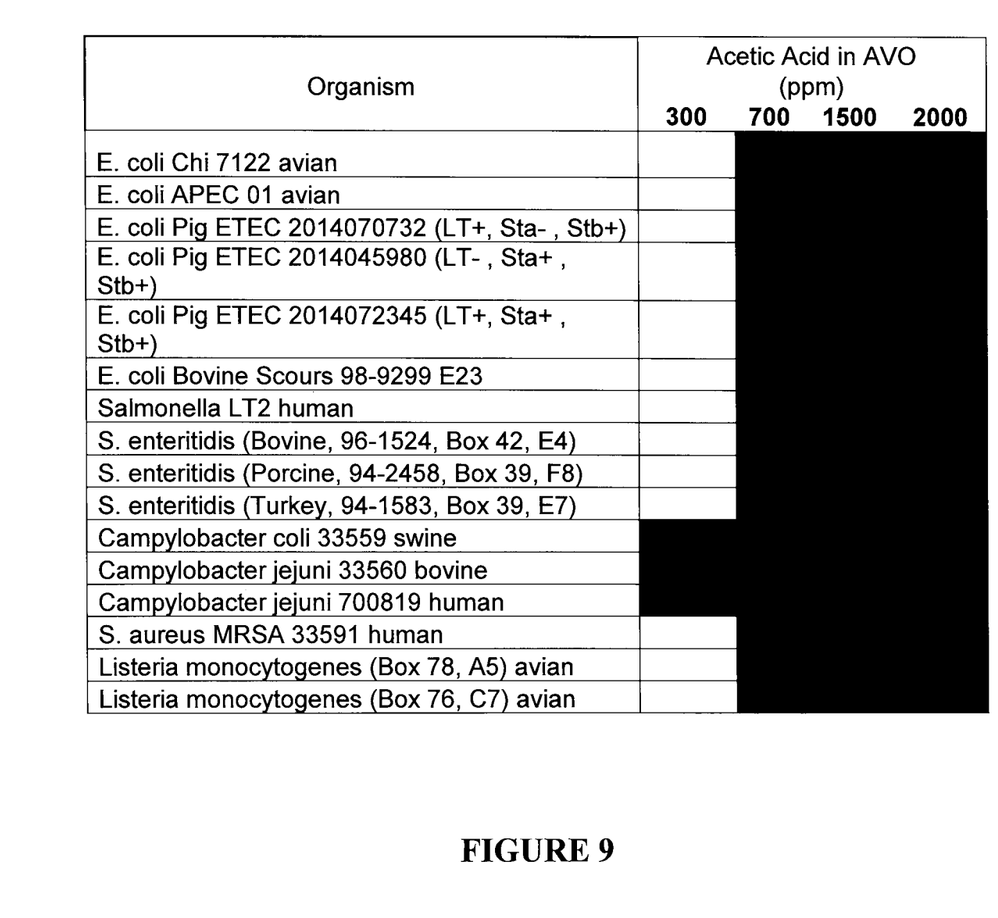
FIG. 9 is a table showing the antimicrobial activity of acetic acid mixed with Acidulated Vegetable Oil.
Figure 10:
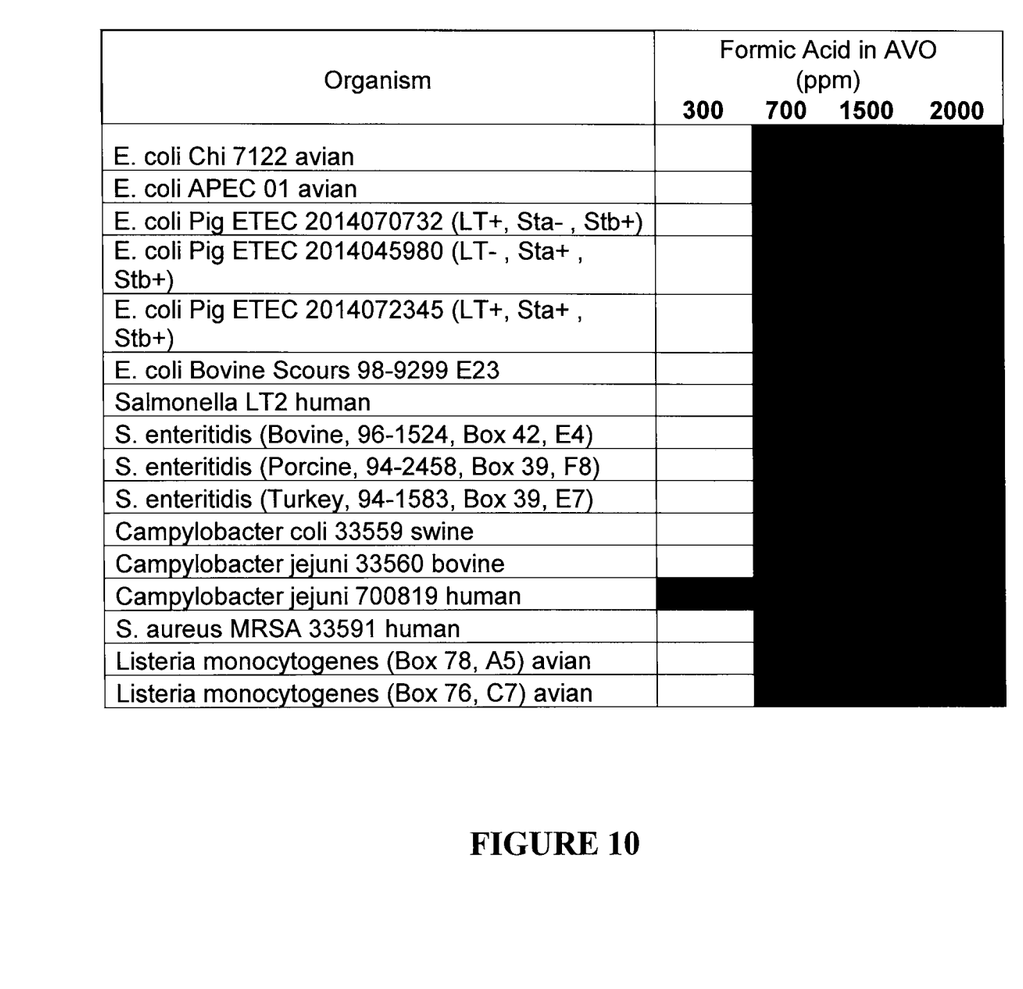
FIG. 10 is a table showing the antimicrobial activity of formic acid mixed with Acidulated Vegetable Oil.

Moreover, FIGS. 5-8 show the antipathogenic effectiveness of organic acids mixed with the Acidulated Vegetable Oil, soybean oil, high-acid tallow, and distillers corn oil. The highest antimicrobial activity came from the mixture of propionic acid and acid oil. Specifically, the mixture showed total effectiveness against all tested pathogens at concentrations of 700 parts per million. Moreover, some effectiveness (partial and total) was shown at 300 parts per million. Mixtures of propionic acid with other types of fats and oils were less effective. Mixed with soybean oil, concentrations of 2000 parts per million was needed for total effectiveness against all studied pathogens. Some effectiveness was shown at lower concentrations. Moreover, mixtures with high-acid tallow and distillers corn oil showed total effectiveness at 1500 parts per million, with partial effectiveness at lower concentrations. Accordingly, when mixed with acid oil, such as Acidulated Vegetable Oil, concentrations of organic acids of less than half may be used with total success. As shown in FIGS. 9-10, acetic acid and formic acid have similar success when mixed with the acid oil. Furthermore, referring to FIGS. 11-14, the antimicrobial action of essential oils including cinnamon, oregano, clove, and thyme oils were evaluated. All essential oils were mixed with acid oil and added to petri dishes with the indicated pathogenic strains. All performed better than acid oil alone, with cinnamon oil exhibiting the greatest antipathogenic behavior.

Example 2

In another example, the antibacterial properties of feed treated with a mixture of acid oil and organic acid was tested. Specifically, two feed samples were collected from two separate turkey finisher barns. The samples were on the floor and partially contaminated with litter/feces and water for several days. Samples were stored at 4° C. until testing was completed. An aliquot from both feeds were sent to a commercial laboratory for microbial assays. The same batch of feed was divided into 2 groups (roughly 1 lbs. or 1000 grams for each group). The control samples were treated with no product. The other two samples were treated with the product shown in Table 1 and well mixed. Then both control and treated feeds were kept at room temperature for 3 days. All four samples were then sent to a commercial laboratory for microbial assays. The results are shown in Tables 4A and 4B. As can be seen, pathogens were mitigated by treating animal feed with compositions of the present invention.

TABLE 4A

Results of experiments testing the antipathogenic effectiveness of the invention in animal feed.

| MICRO-BIOLOGY ANALYSIS | Control Feed - 1 | | | Treated Feed - 1 | |
|---|---|---|---|---|---|
| | UNIT cfu/g | org/25 g | organism | UNIT cfu/g | org/25 g |
| E. coli (generic) | 19000 | | | n.d | |
| Total coliforms | 47000 | | | n.d | |
| Salmonella | | positive | S. Senftenberg | | negative |

TABLE 4B

Results of experiments testing the antipathogenic effectiveness of the invention in animal feed.

| MICROBIOLOGY ANALYSIS | Control Feed - 2 | | | Treated Feed - 2 | |
|---|---|---|---|---|---|
| | UNIT cfu/g | org/25 g | organism | UNIT cfu/g | org/25 g |
| E. coli (generic) | n.d. | | | n.d. | |
| Total coliforms | 50 | | | n.d. | |
| Salmonella | | positive | S. Reading | | negative |

Example 3

The composition shown in Table 1 above was added to the feed of turkeys to test the effect of the invention in poultry. In the experiment, animal feed treated with the composition was fed to four groups of birds: two control groups having no organic acids and two experimental treatment groups (Treatment in Table 5). Each group included twenty birds and were kept in separate pens. Average body weight (BW), Feed Conversion Ratio (FCR), and Average Daily Gain (ADG) was measured with results shown below in Table 5.

TABLE 5

Results of experiments testing the effects of feed including the composition of Table 1 on turkeys.

| | In 21 days | | |
|---|---|---|---|
| Group | BW, g | FCR | ADG |
| Control | 471 | 0.77 | 13.35 |
| Treatment | 475 | 0.69 | 14.34 |

As shown in Table 5, the treated group displayed increased ADG. Moreover, the treated group displayed lower FCR. Both effects are desired and beneficial to the birds. In addition, the experiment showed the following beneficial results: protection of the intestinal tract from infectious pathogens such as Salmonella, E. coli, Campylobacter, Listeria, Clostridium, worms, and more; creation of a favorable environment for beneficial bacteria in the gut; balance of the guy microflora population; support of a healthy digestive system; reduction of the cocci load in the gut; increased immune functions; maintenance of gut pH; no adverse effects on beneficial bacteria; better digestion, absorption, and utilization of nutrients; providing energy and essential fatty acids; increased performance and production; increased feed intake; better meat and egg quality; and minimization of pathogen contamination levels throughout the litter.

Example 4

In this example, Salmonella load from a commercial farm was tested before and after treatment with feed including the compositions of the present invention. For the experiment, a disposable plastic boot cover over each shoe or boot used to protect personal clothing was used to collect samples. To prevent against cross-contamination of the sample from shoe sole carryover, each sample was individually collected and secured in a Ziploc bag. The outside of the Ziploc bag was disinfected using a pre-moistened alcohol wipe (70% ethanol). Then the samples were sent to a commercial laboratory for microbial assays. Testing was via the bootie swab method, as is known in the art. As shown in Table 6, *Salmonella* load was decreased with consumption of feed including compositions of the present invention.

TABLE 6

Results of *Salmonella* load experiment from a commercial farm before and after feed including compositions of the present invention, wherein the first row of each customer represents the control group.

| Customer Name | Flock Number | *Salmonella* Quantitative (CFU/mL) | |
|---|---|---|---|
| HC | 12-1801 | 5000 | (Control) |
| HC | 12-1802 | 2.18 | (Treatment) |
| HC | 12-1803 | <0.68 | (Treatment) |
| HC | 12-1804 | 171.03 | (Treatment) |
| GR | 09-1801 | 3500 | (Control) |
| GR | 09-1802 | 0.28 | (Treatment) |
| GR | 09-1803 | 1.68 | (Treatment) |
| GR | 09-1804 | 1627.95 | (Treatment) |
| BD | 46-1802 | 6000 | (Control) |
| BD | 46-1802 | 42.31 | (Treatment) |
| GL | 10-1802 | 6000 | (Control) |
| GL | 10-1803 | <0.68 | (Treatment) |
| GL | 10-1804 | <0.68 | (Treatment) |

Example 5

The composition shown in Table 2 above was added to the feed of swine to test the effects of same in the swine industry. In the experiment, animal feed treated with the composition was fed to four groups of pigs: two control groups and two experimental groups. Each group included five pigs. Average body weight, FCR, and ADG was measured at day 1 and day 29 with results shown below in Table 7.

TABLE 7

Results of experiments testing the effects of feed including the composition of Table 2 on swine.

| Group (5 × 2 pigs per treatment) | Day - 1 BW Lb. | Day - 29 | FCR | ADG |
|---|---|---|---|---|
| Control | 10.82 | 22.04 | 3.00 | 0.39 |
| Treatment | 11.52 | 23.77 | 2.86 | 0.42 |

Accordingly, body weight is higher in the treatment group than the control group (having no organic acids), as is desirable. Moreover, ADG is higher and FCR is lower, which are also desirable characteristics. In addition to the above measured results, the following advantageous effects were observed: protection of the intestinal tract from infectious pathogens such as *Salmonella, E. coli, Campylobacter, Listeria, Clostridium*, worms, and others; creation of a favorable environment for the beneficial bacteria in the gut; balancing of the gut microflora population; support of healthy digestive system and acidification of the swine gut; increased immune functions; no adverse effects on beneficial bacteria; better digestion, absorption, and utilization of nutrients; providing energy and essential fatty acids; increased performance and production; and increased feed intake.

Example 6

In the above experiments of example 5, testing was done to measure the villous height, also known as crypt depth, of villi in the duodenum, jejunum, and ileum of the digestive tract. Namely, five sections of formalin-fixed small intestine were collected and included: 1) duodenum, 2) proximal jejunum, 3) mid-jejunum, 4) distal jejunum, and 5) ileum. Briefly, the entire small intestine was extracted from each pig, the mesentery was removed, and the entire small intestine was folded into three segments of equal length. The resultant s-shaped arrangement of intestine allowed for collection of the same relative locations (1-5) based on total small intestinal length from each pig for histopathology.

Histopathology and morphometry: After 48 hours fixation in neutral buffered formalin, tissue sections were trimmed, processed, and embedded in paraffin. Four micron thick sections were cut and routinely stained with hematoxylin and eosin. Non-enteric tissues were evaluated for evidence of systemic inflammation by a veterinary pathologist blinded to the treatment group and dpi. Small intestinal sections were identified by location, and villous length and crypt-depth were evaluated blindly by a veterinary pathologist. In each of the five small intestinal sections, three perceived full-length villi and crypts, based on tissue orientation from each of four serial sections, were measured using a computerized image system (Olympus DP72 camera, cellSens1 digital imaging software). The mean villous length and crypt-depth from each intestinal segment was used to determine statistical differences. Villous height to crypt-depth ratios were also determined using these calculated means.

Figure 11:
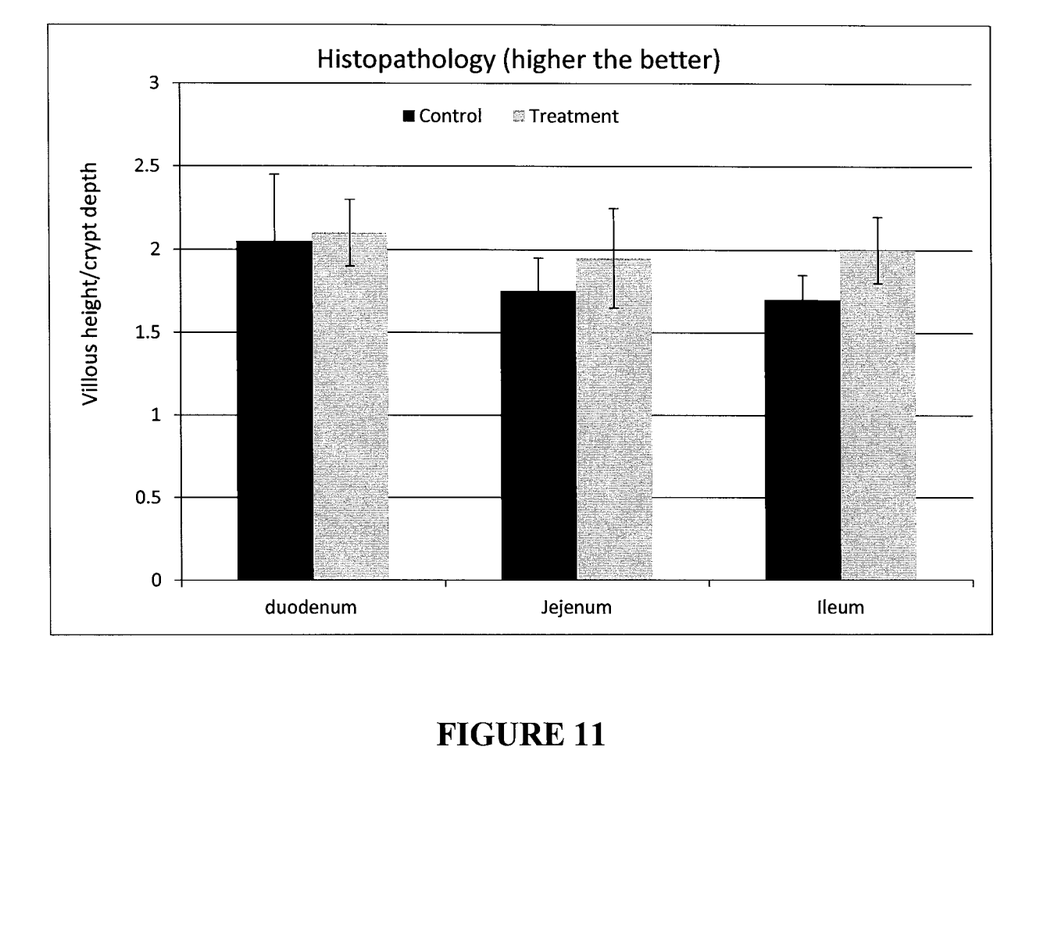
FIG. 11 is a chart showing the villous height measurements of control groups of swine and groups of swine treated with compositions and methods of the present invention.

Results are shown in FIG. 11. More specifically, measurements were taken in both control and treatment groups, with a higher measurement being desirable. Villous height is an indicator of intestinal health and leads to better nutrient absorption. In all three locations, treatment groups showed increased height, further showing advantages of the present invention.

Example 7

In further experiments directed to swine, two trials similar to example 5 were carried out on a larger commercial scale. Average body weight, FCR, and ADG were measured over a greater period of time, with further detail and results provided in Tables 8 (Trial 1) and 9 (Trial 2).

TABLE 8

Results of commercial trial #1 with swine.

| Treatment | Number of Pigs | Mortality % | Avg. Out Wt. | Avg. Daily gain | Feed Conversion |
|---|---|---|---|---|---|
| Control | 44,219 | 1.77 | 31.54 | 0.62 | 1.66 |
| Treatment | 21,080 | 0.92 | 34.47 | 0.69 | 1.46 |

TABLE 9

Results of commercial trial #2 with swine.

| Treatment | Number of Pigs | Mortality % | Avg. Out Wt. | Avg. Daily gain |
|---|---|---|---|---|
| Control | 13,372 | 5.5 | 33.63 | 0.78 |
| Treatment | 13,390 | 3.1 | 37.34 | 0.93 |

As shown in the tables, higher body weight was measured in the treatment group. Moreover, better feed conversion and higher daily gain were also observed in the treatment group than the control groups. All is desirable. In addition, the mortality rate decreased in the treatment groups, which is also desirable. Although the increased death rate at the Customer 1 treatment barn was unexpected, it was due to an isolated issue at the customer's barn that caused a one-month death rate of 12-16% that increased the overall average. Removing the data points associated with the incident would bring the death rate to 6.09%, showing a beneficial effect of treatment on death rate. Without that issue, the treatment death rate would have been much lower. Moreover, it is anticipated that the treatment decreased the effects of the incident.

Furthermore, Tables 10A and 10B show additional observations from the commercial pig trials.

TABLE 10A

Further measurements from the commercial swine trials.

| | Customer 1: HCS - AVG | |
|---|---|---|
| | Control | Treatment |
| Repeat service percentage | 2.35 ± 1.34 | 2.35 ± 0.66 |
| Ave pigs born | 13.45 ± 0.39 | 13.77 ± 0.47 |
| Ave LIVE pigs born/litter | 12.28 ± 0.29 | 12.64 ± 0.41 |
| Farrowing Rate | 90.77 ± 1.50 | 87.65 ± 2.83 |
| Pigs weaned per little | 11.49 ± 0.25 | 11.75 ± 0.26 |
| PreWeaning mortality | 7.71 ± 0.97 | 7.03 ± 0.98 |
| Ave pigs weaned/mated female per year | 29.06 ± 0.91 | 30.04 ± 0.99 |
| Cull Rate | 66.26 ± 11.71 | 39.11 ± 12.63 |
| Death Rate | 7.72 ± 2.05 | 6.08 ± 1.25 |

TABLE 10B

Further measurements from the commercial swine trials.

| | Customer 2: LKS - AVG | |
|---|---|---|
| | Control | Treatment |
| Repeat service percentage | 4.60 ± 0.83 | 2.20 ± 1.19 |
| Ave pigs born | 14.17 ± 0.14 | 14.41 ± 0.44 |
| Ave LIVE pigs born/litter | 12.81 ± 0.13 | 13.22 ± 0.43 |
| Farrowing Rate | 93.50 ± 0.74 | 95.40 ± 4.03 |
| Pigs weaned per little | 12.07 ± 0.09 | 12.25 ± 0.18 |
| PreWeaning mortality | 8.00 ± 0.46 | 7.70 ± 1.26 |
| Ave pigs weaned/mated female per year | 28.55 ± 0.85 | 29.79 ± 1.40 |
| Cull Rate | 56.70 ± 6.93 | 39.30 ± 9.42 |
| Death Rate | 4.40 ± 2.32 | 1.70 ± 2.43 |

As shown in Table 10, a higher number of live piglets were born in the treated groups. Moreover, there was a higher number of weaned piglets with a decrease in pre-weaning mortality. A lower cull rate was observed in the treatment groups. In addition, one treatment group showed a significant decrease in death rate.

Experiment 8

The effects of compositions of the present invention were tested on porcine epidemic diarrhea virus (PEDv). Feed samples were provided by the inventors. The same batch of feed was divided into 3 groups with 3 replications (roughly 2 lbs or 2000 grams for each group). The groups #1 and #2 were treated with no product. The feed in groups #3 was treated evenly (well mixed) with a product shown in Table 3. Then the treated feeds were provided to Veterinary Diagnostic Laboratory, Iowa State University (ISU). Upon arrival at ISU, feeds were stored at 4° C. until testing was completed. Each treatment and sampling time have 3 replications.

PEDV was provided by ISU. PEDV isolate USA/IN19338/2013 with an infectious titer of $10^5$ $TCID_{50}$/ml was used to inoculate feed. Inoculation of feed was conducted at a 1:10 dilution (10 ml of virus into 90 grams of feed) for a final theoretical concentration of $1 \times 10^4$ $TCID_{50}$/ml. PEDV analysis was conducted using a PEDV nucleocapsid gene-based quantitative real-time RT-PCR.

Results are shown in Tables 11A and 11B. As can be seen, significant reduction of the genomic copies of the virus were observed with treatment of compositions of the present invention.

TABLE 11A

Results of experiments testing the effects of compositions of the present invention on PEDv in feed (In-vitro).

| | PEDV PCR $C_T$ | | |
|---|---|---|---|
| Sample ID | 0 day Average | 4 day Average | 14 day Average |
| Negative control | >=36/Negative | >=36/Negative | >=36/Negative |
| Untreated Control | 22.8/Positive | 24.5/Positive | 23.6/Positive |
| Treatment | 24.4/Positive | 27.1/Positive | 27.0/Positive |

TABLE 11B

Results of experiments testing the effects of compositions of the present invention on PEDv in feed (In-vitro).

| | Genomic copies/ml | | | | |
|---|---|---|---|---|---|
| Sample ID | 0 day Average | 4 day Average | % Reductions | 14 day Average | % Reductions |
| Negative control | | | | | |
| Untreated Control | 27416462 | 8419073 | 69.29 | 15730193 | 42.63 |
| Treatment | 8935009 | 1412264 | 84.19 | 1504380 | 83.16 |

Although various representative embodiments of this invention have been described above with a certain degree of particularity, those skilled in the art could make numerous alterations to the disclosed embodiments without departing from the spirit or scope of the inventive subject matter set forth in the specification and claims. Joinder references (e.g. attached, adhered, joined) are to be construed broadly and may include intermediate members between a connection of elements and relative movement between elements. As such, joinder references do not necessarily infer that two elements are directly connected and in fixed relation to each other. In some instances, in methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

Although the present invention has been described with reference to the embodiments outlined above, various alternatives, modifications, variations, improvements and/or substantial equivalents, whether known or that are or may be presently foreseen, may become apparent to those having at least ordinary skill in the art. Listing the steps of a method in a certain order does not constitute any limitation on the order of the steps of the method. Accordingly, the embodiments of the invention set forth above are intended to be illustrative, not limiting. Persons skilled in the art will recognize that changes may be made in form and detail without departing from the spirit and scope of the invention. Therefore, the invention is intended to embrace all known or earlier developed alternatives, modifications, variations, improvements, and/or substantial equivalents.

The invention claimed is:

1. A composition comprising:
   acid oil comprising free fatty acids having twelve or more carbon atoms and having a pKa ranging from 2.5 to 4.0; and
   at least one organic acid selected from the group consisting of formic acid, acetic acid, propionic acid, butyric acid, and combinations thereof;
   wherein the pKa of the composition ranges from 2.5 to 4.0; and
   wherein the concentration of said at least one organic acid ranges from 0.15% to 4.3%.

2. The composition of claim 1 wherein the pKa of the acid oil and the composition ranges from 2.5 to 3.0.

3. The composition of claim 1 wherein the acid oil includes at least 40% free fatty acids by weight.

4. The composition of claim 3 wherein said acid oil is Acidulated Vegetable Oil.

5. The composition of claim 1 further comprising at least one plant extract.

6. The composition of claim 5 wherein said plant extract is an essential oil.

7. The composition of claim 6 wherein said essential oil is selected from the group consisting of cinnamon oil, oregano oil, clove oil, thyme oil, and combinations thereof.

8. The composition of claim 1 wherein the acid oil is selected from the group consisting of Acidulated Vegetable Oil, soybean fatty acids, corn fatty acids, coconut fatty acids, canola fatty acids, sunflower fatty acids, tallow fatty acids, and combinations thereof.

9. The composition of claim 1 further comprising additional fats and/or oils.

10. The composition of claim 9 wherein the pKa of the acid oil and additional fats and/or oils together ranges from 2.5 to 4.0.

11. The composition of claim 10 wherein the pKa of the acid oil and additional fats and/or oils together ranges from 2.5 to 3.0.

12. The composition of claim 1 wherein the acid oil comprises fatty acids having between twelve and twenty carbon atoms.

13. A composition comprising a lipid-based carrier having a pKa ranging from 2.5-4.0 and an organic acid selected from the group consisting of formic acid, acetic acid, butyric acid, C5-C29 carboxylic acids, and combinations thereof, wherein said organic acid is not a free fatty acid, and wherein the pKa of the composition ranges from 2.5-4.0; and wherein the concentration of said organic acid ranges from 0.15% to 4.3%.

14. A composition comprising acid oil having free fatty acids and at least one organic acid dispersed in said acid oil, and wherein the pKa of said acid oil ranges from 2.5 to 4.0, wherein said organic acid is selected from the group consisting of formic acid, acetic acid, butyric acid, C5-C29 carboxylic acids, and combinations thereof, wherein said organic acid is not a free fatty acid, wherein said acid oil is selected from the group consisting of Acidulated Vegetable Oil, soybean fatty acids, corn fatty acids, canola fatty acids, sunflower fatty acids, tallow fatty acids, and combinations thereof, wherein the pKa of the composition ranges from 2.5 to 4.0; and wherein the pKa of the composition ranges from 2.5-4.0; and wherein the concentration of said organic acid ranges from 0.15% to 4.3%.

15. A composition comprising:
   at least 95% acidulated vegetable oil derived from vegetable oil refining comprising at least 40% free fatty acids by weight having twelve or more carbon atoms and having a pKa ranging from 2.5 to 4.0; and
   0.15%-4.3% of at least one organic acid selected form the group consisting of formic acid, acetic acid, butyric acid, C5-C29 carboxylic acids, and combinations thereof, wherein said organic acid is not a free fatty acid;
   wherein the pKa of the composition ranges from 2.5 to 4.0.

* * * * *